US011151998B2

(12) United States Patent
Han et al.

(10) Patent No.: US 11,151,998 B2
(45) Date of Patent: Oct. 19, 2021

(54) ARTIFICIAL INTELLIGENCE DEVICE

(71) Applicant: LG ELECTRONICS INC., Seoul (KR)

(72) Inventors: Jongwoo Han, Seoul (KR); Hangil Choi, Seoul (KR); Yoojin Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 127 days.

(21) Appl. No.: 16/500,040

(22) PCT Filed: Jun. 13, 2017

(86) PCT No.: PCT/KR2017/006123
§ 371 (c)(1),
(2) Date: Oct. 1, 2019

(87) PCT Pub. No.: WO2018/199379
PCT Pub. Date: Nov. 1, 2018

(65) Prior Publication Data
US 2020/0184968 A1 Jun. 11, 2020

(30) Foreign Application Priority Data
Apr. 24, 2017 (KR) .................. 10-2017-0052483

(51) Int. Cl.
G10L 15/16 (2006.01)
G10L 15/22 (2006.01)
(Continued)

(52) U.S. Cl.
CPC .............. G10L 15/22 (2013.01); G06F 3/165 (2013.01); G06K 9/00335 (2013.01);
(Continued)

(58) Field of Classification Search
CPC .............. G10L 15/22; G10L 2015/223; G10L 2015/227; G10L 2015/228; G10L 15/1815;
(Continued)

(56) References Cited

U.S. PATENT DOCUMENTS

2016/0127641 A1* 5/2016 Gove .................... G01B 11/00
348/143

FOREIGN PATENT DOCUMENTS

JP 2005-332023 A 12/2005
KR 10-2011-0007413 A 1/2011
(Continued)

OTHER PUBLICATIONS

International Search Report, issued in PCT/KR2017/006123, PCT/ISA/210, dated Jan. 23, 2018.

Primary Examiner — Charlotte M Baker
(74) Attorney, Agent, or Firm — Birch, Stewart, Kolasch & Birch, LLP

(57) ABSTRACT

An artificial intelligence device according to an embodiment of the present invention may include a microphone configured to receive voice; a sound output unit configured to output sound; an artificial intelligence unit configured to acquire context information of a target, based on at least one of an image received from a camera disposed outside and a voice received from the microphone, generate feedback information according to the acquired context information, and determine output volume intensity of the generated feedback information; and a controller configured to control the sound output unit to output the feedback information at the determined output volume intensity.

12 Claims, 15 Drawing Sheets

(51) Int. Cl.
  *G06T 7/70* (2017.01)
  *H04W 4/80* (2018.01)
  *G06N 20/00* (2019.01)
  *G06F 3/16* (2006.01)
  *G06K 9/00* (2006.01)
  *G06K 9/46* (2006.01)
  *G06K 9/72* (2006.01)
  *G10L 15/18* (2013.01)
  *G10L 15/24* (2013.01)
  *H04R 1/32* (2006.01)

(52) U.S. Cl.
  CPC ........... *G06K 9/00664* (2013.01); *G06K 9/46* (2013.01); *G06K 9/72* (2013.01); *G06N 20/00* (2019.01); *G06T 7/70* (2017.01); *G10L 15/1815* (2013.01); *G10L 15/24* (2013.01); *H04R 1/323* (2013.01); *H04W 4/80* (2018.02); *G06T 2207/30196* (2013.01); *G10L 2015/223* (2013.01); *G10L 2015/227* (2013.01); *G10L 2015/228* (2013.01)

(58) Field of Classification Search
  CPC . G10L 15/24; G06T 7/70; G06T 2207/30196; H04W 4/80; H04W 4/02; G06K 9/00335; G06K 9/00664; G06K 9/46; G06K 9/72; G06K 9/00288; G06K 9/6267; G06F 3/167; G06F 3/165; H04R 2430/01; H04R 1/323; G06N 7/005; G06N 5/003; G06N 20/00; G06N 3/126; G06N 3/00; G05B 13/04; G05B 13/041
  USPC ....... 704/232, 231, 225; 706/11; 700/19, 17, 700/20, 83; 386/E5.004, E5.043; 348/40, 143
  See application file for complete search history.

(56) References Cited

FOREIGN PATENT DOCUMENTS

| KR | 10-2014-0089740 A | 7/2014 |
| KR | 10-2015-0141268 A | 12/2015 |
| KR | 10-2016-0137008 A | 11/2016 |

* cited by examiner

ARTIFICIAL INTELLIGENCE DEVICE

CROSS REFERENCE TO RELATED APPLICATIONS

This application is the National Phase of PCT/KR2017/006123 filed on Jun. 13, 2017, which claims priority under 35 U.S.C. § 119(a) to Patent Application No. 10-2017-0052483 filed in the Republic of Korea on Apr. 24, 2017, all of these applications are hereby expressly incorporated by reference into the present application.

TECHNICAL FIELD

The present invention relates to an artificial intelligence device, and more particularly, to an artificial intelligence device that provides information suitable for a user's context.

BACKGROUND ART

Artificial intelligence is a field of computer science and information technology that studies how to enable computers to do things like thinking, learning, and self-development that human intelligence can do, and means enabling computers to imitate human intelligent action.

In addition, artificial intelligence does not exist by itself but is directly or indirectly related to other fields of computer science. Particularly in modern times, attempts are being actively made to introduce artificial intelligence elements in various fields of information technology and use artificial intelligence elements to solve problems in those fields.

Meanwhile, in the related art, a context awareness technology for recognizing a user's context using artificial intelligence and providing the desired information in the desired form by a user has been actively studied.

As the context awareness technology has been developed, the demand for a mobile terminal capable of performing a function appropriate to a user's context is increasing.

For example, a conventional artificial intelligence device may search for a location of a target through image recognition and output a notification or information in a direction corresponding to the location of the target.

However, the conventional artificial intelligence device outputs a notification or information at the same volume intensity, and in a case where the volume intensity is large, there is a problem of causing unnecessary noise to the listener or the person around the listener.

In addition, there was a problem that the listener cannot be heard in a case where the intensity of the volume of notification or information output is small.

In addition, so as to be unsuitable for the context of the target, in a case where the notification or information is output only by sound (for example, when the target is not near an artificial intelligence device), there is a problem that information is not smoothly delivered to the target.

DISCLOSURE

Technical Problem

An object of the present invention is to solve the above and other problems.

An object of the present invention is to provide an artificial intelligence device capable of automatically adjusting the output volume intensity of the feedback information based on the target context information when outputting feedback information suitable for the target context information.

An object of the present invention is to provide an artificial intelligence device capable of recognizing the context of a target and providing feedback information in an output method suitable for the recognized target context.

Technical Solution

An artificial intelligence device according to an embodiment of the present invention may include a microphone configured to receive voice; a sound output unit configured to output sound; an artificial intelligence unit configured to acquire context information of a target, based on at least one of an image received from a camera disposed outside and a voice received from the microphone, generate feedback information according to the acquired context information, and determine output volume intensity of the generated feedback information; and a controller configured to control the sound output unit to output the feedback information at the determined output volume intensity.

The context information of the target may include at least one of the attributes of the target, an action of the target, and a position of the target.

The artificial intelligence unit may predict the context of the target and generates the feedback information indicating a prediction result, using the context information of the target.

The artificial intelligence unit may determine the output volume intensity of the feedback information to be less than the preset volume intensity, in a case where the intensity of the voice input through the microphone is less than a preset intensity.

The artificial intelligence unit may determine the output volume intensity of the feedback information to be more than the preset volume intensity, in a case where the intensity of the voice input through the microphone is more than a preset intensity.

The artificial intelligence unit may select a target to be uttered by using the voice received through the microphone among the plurality of targets in a case where a plurality of targets are included in the image, and the controller may output the feedback information through the sound output unit in a direction of a selected target.

The artificial intelligence device may further include a short range communication module configured to perform short range communication with a mobile terminal of the target, in which the feedback information may include a notification received by the mobile terminal.

The artificial intelligence device may further include a short range communication module configured to perform short range communication with a mobile terminal of the target, in which the artificial intelligence unit may determine an output method of the feedback information according to the context information of the target, and the output method may be a method of outputting the feedback information through any one of the short range communication module or the sound output unit.

A device may include a short range communication module configured to perform short range communication with a mobile terminal of a target, a microphone configured to receive voice; a sound output unit configured to output sound; an artificial intelligence unit configured to acquire context information of a target, based on at least one of an image received from a camera disposed outside and a voice received from the microphone, generate feedback information according to the acquired context information, and determine any one of the short range communication module or the sound output unit with an output method of the generated feedback information; and a controller configured to control any one of the short range communication module or the sound output unit to output the feedback information in the determined output method.

The artificial intelligence unit may transmit the feedback information in response to the voice received through the microphone to the mobile terminal through the short range communication module, in a case where the target does not exist in the image.

The artificial intelligence unit may output the feedback information in response to the voice received through the microphone through the sound output unit in a case where the target exists in the image.

The context information of the target may include at least one of the attributes of the target, an action of the target, and a position of the target.

The artificial intelligence unit may predict the context of the target, using the context information of the target and generates the feedback information indicating a prediction result.

The artificial intelligence unit may select a target to be uttered by using the voice received through the microphone among the plurality of targets in a case where a plurality of targets are included in the image and outputs the feedback information through the sound output unit in a direction of a selected target.

The artificial intelligence unit may generate emergency context information regardless of the context information of the target, in a case where a dangerous context of the target is detected, based on the image, and the controller may transmit the generated emergency context information to the mobile terminal through the short range communication module, and outputs the emergency context information as a sound having a preset volume intensity or more through the sound output unit.

Further scope of the applicability of the present invention will become apparent from the following detailed description. However, various changes and modifications within the spirit and scope of the present invention can be clearly understood by those skilled in the art, and therefore, specific embodiments, such as the detailed description and the preferred embodiments of the present invention, should be understood as given by way of example only.

Advantageous Effect

According to an embodiment of the present invention, the output volume intensity of the feedback information is automatically adjusted according to the context of the target, so that unnecessary noise may not be generated to the target and the listener around the target.

In addition, according to an embodiment of the present invention, the output volume intensity of the feedback information is automatically adjusted according to the target context, so that the feedback information can be smoothly provided to the listener.

In addition, according to an embodiment of the present invention, the output method of the feedback information is provided according to the context of the target, so that the target may be provided with the feedback information in any context.

BEST MODE

Figure 1A:
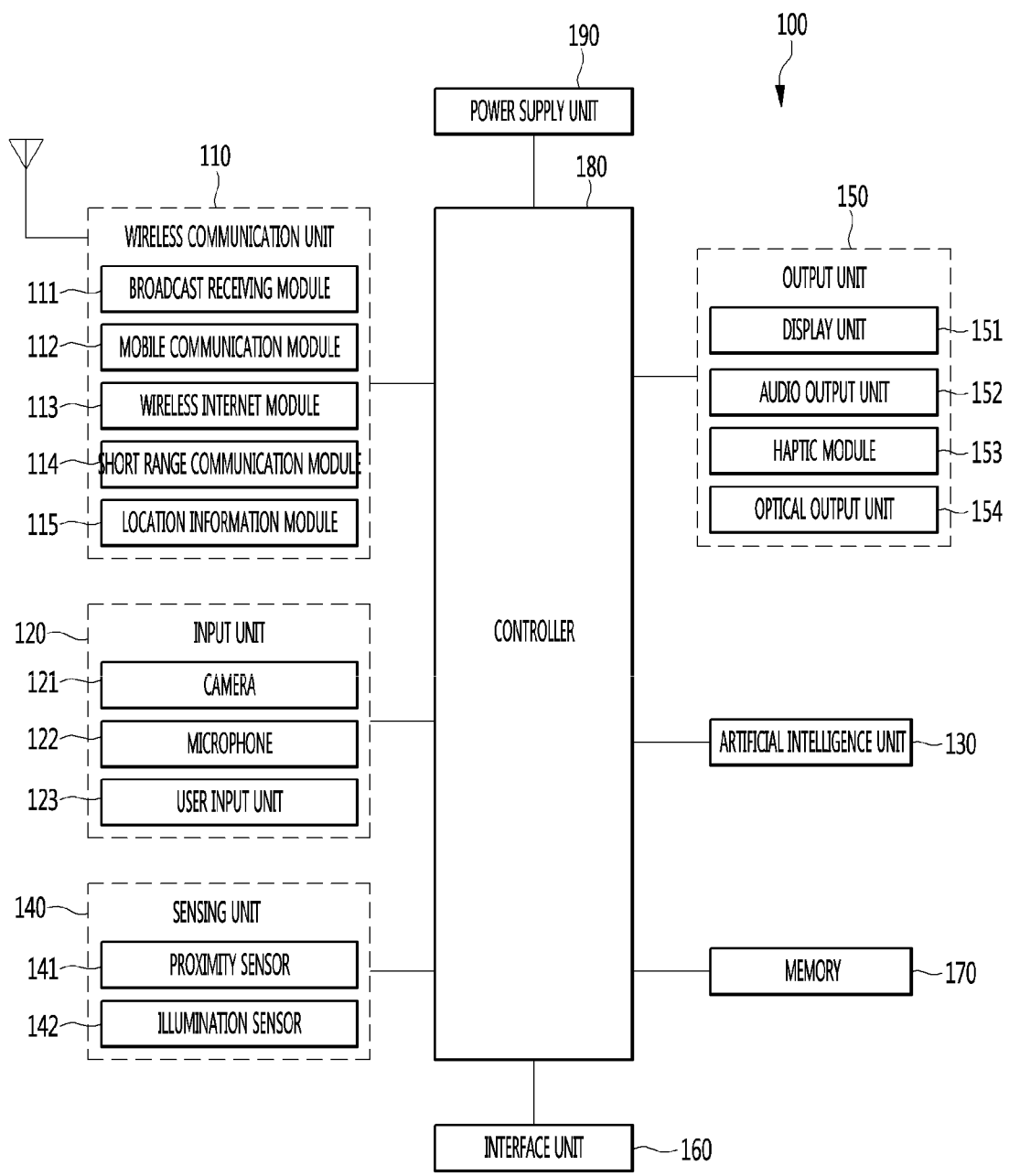
FIG. 1a is a block diagram illustrating a mobile terminal related to the present invention.

Hereinafter, Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that if an element is referred to as being "connected with" another element, the element can be directly connected with the other element or intervening elements may also be present. In contrast, if an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

The terminals presented herein may be implemented using a variety of different types of terminals. Examples of such terminals include cellular phones, smartphones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of terminals. However, such teachings apply equally to other types of terminals, such as those types noted herein. In addition, these teachings may also be applied to stationary terminals such as digital TV, desktop computers, and the like.

Figure 1B:
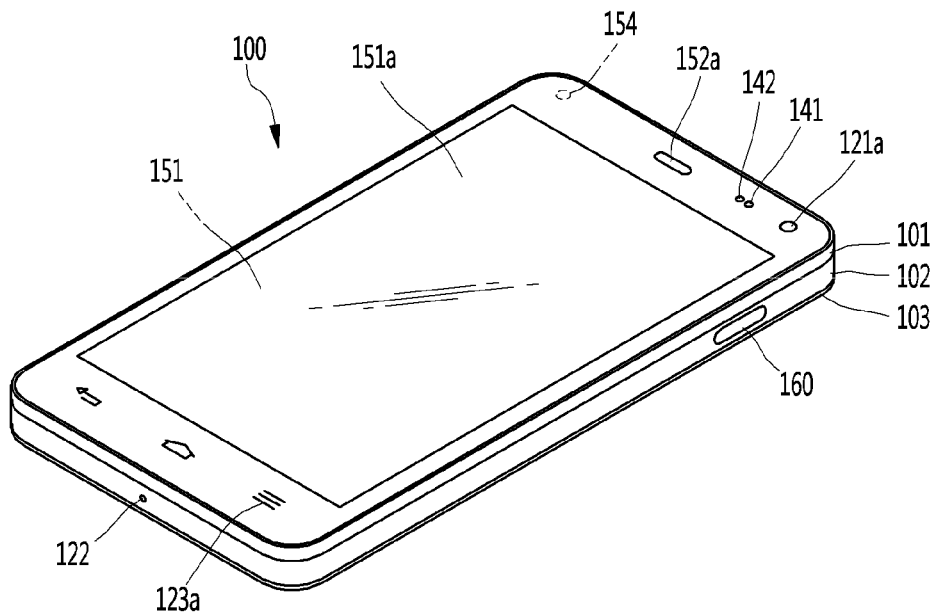
FIGS. 1b and 1c are conceptual diagrams illustrating one example of the mobile terminal related to the present invention, viewed from different directions.
Figure 1C:
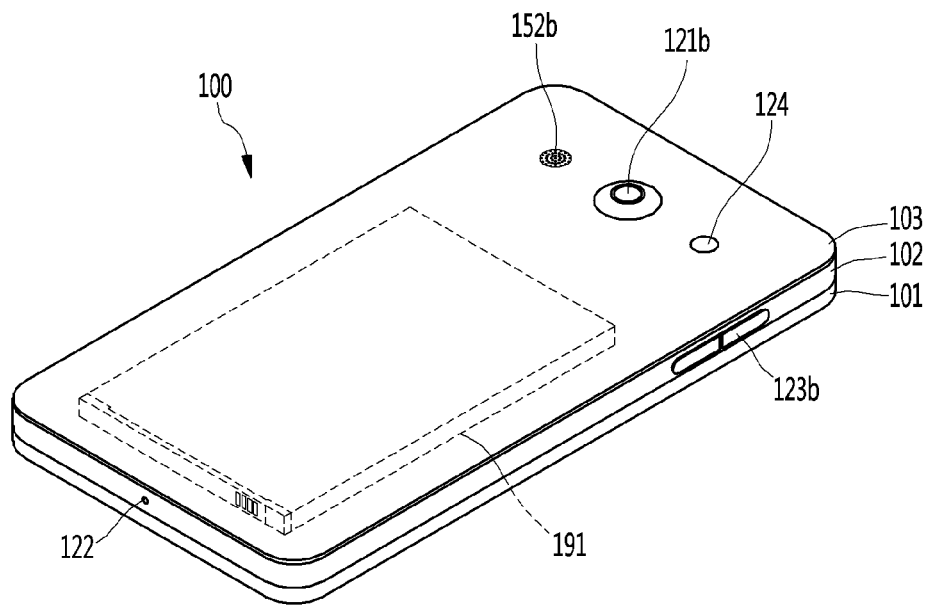

Referring to FIGS. 1a to 1c, FIG. 1a is a block diagram illustrating a mobile terminal related to the present invention, and FIGS. 1b and 1c are conceptual diagrams illustrating one example of the mobile terminal related to the present invention, viewed from different directions.

The terminal 100 may include components, such as a wireless communication unit 110, an input unit 120, an artificial intelligence unit 130, a sensing unit 140, an output unit 150, an interface unit 160, a memory 170, a controller 180, a power supply unit 190, and the like.

FIG. 1a illustrates the mobile terminal having various components, but it is understood that implementing all of the illustrated components is not a requirement, and that greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules for connecting the mobile terminal 100 to one or more networks.

The wireless communication unit 110 may include at least one of a broadcast receiving module 111, a mobile communication module 112, a wireless Internet module 113, a short range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The artificial intelligence unit 130 performs a role of processing information based on artificial intelligence technology and may include one or more modules that perform at least one of learning of information, inferring of information, perceiving of information, and processing of natural language.

The artificial intelligence unit 130 may use a machine learning technique to perform at least one of learning, inferring, and processing of a large amount of information (big data) such as information stored in the mobile terminal, environment information around the mobile terminal, and information stored in an external storage that can be communicated with. In addition, the artificial intelligence unit 130 can predict (or infer) an operation of at least one executable mobile terminal using information learned using the machine learning technique, and control the mobile terminal so that the most feasible operation of the at least one predicted operations is executed.

Machine learning technology is a technology that collects and learns a large amount of information based on at least one algorithm and determines and predicts information based on the learned information. The learning of information is an operation of grasping characteristics, rules, and determination criteria of information, quantifying a relationship between information, and predicting new data using the quantized pattern.

The algorithms used by these machine learning techniques can be algorithms based on statistics, for example, decision trees that use tree structures as predictive models, the artificial neural network that mimics the neural network structures and functions of organisms. Neural networks, genetic programming based on living evolutionary algorithms, clustering that distributes observed examples into subsets of clusters, and a Monte Carlo method, which computes function values with probability through randomized random numbers.

As a field of machine learning technology, deep learning technology is a technology that performs at least one of learning, determining, and processing information by using an artificial neural network algorithm. The artificial neural network may have a structure that connects layers to layers and transfers data between layers. Such deep learning technology can learn a huge amount of information through an artificial neural network using a graphic processing unit (GPU) optimized for parallel computation.

Meanwhile, the artificial intelligence unit 130 collects (senses, monitors, extracts, detects, receives) signals, data, information, or the like input or output from the components of the mobile terminal in order to collect a large amount of information for applying the machine learning technology. In addition, the artificial intelligence unit 130 may collect (sense, monitor, extract, detect, receive) signals, data, information, and the like stored in external storage (for example, a cloud server) connected through communication. More specifically, the collection of information may be understood as a term including operation of sensing information through a sensor, extracting information stored in the memory 170, or receiving information from external storage through communication.

The artificial intelligence unit 130 may sense information in the mobile terminal, surrounding environment information surrounding the mobile terminal, and user information through the sensing unit 140. In addition, the artificial intelligence unit 130 may receive a broadcast signal and/or broadcast related information, a wireless signal, wireless data, and the like through the wireless communication unit 110. In addition, the artificial intelligence unit 130 may receive image information (or signal), audio information (or signal), data from the input unit, or information input from a user.

The artificial intelligence unit 130 collects a large amount of information in real-time on the background, learns the information, and stores the processed information (for example, knowledge graph, command policy, personalization database, conversation engine, or the like) in an appropriate form to the memory 170.

In addition, based on the information learned using the machine learning technology, if the operation of the mobile terminal is predicted, in order to execute the predicted operation, the artificial intelligence unit 130 can control the components of the mobile terminal, or transmit the control command for executing the predicted operation to the controller 180. The controller 180 can execute the predicted operation by controlling the mobile terminal based on the control command.

Meanwhile, when a specific operation is performed, the artificial intelligence unit 130 can analyze historical information indicating the performance of a specific operation through machine learning technology, and update the previously learned information based on the analysis information. Thus, the artificial intelligence unit 130 may improve the accuracy of the information prediction.

Meanwhile, in the present specification, the artificial intelligence unit 130 and the controller 180 may be understood as the same component. In this case, a function performed by the controller 180 described herein may be expressed as being performed by the artificial intelligence unit 130, and the controller 180 may be named as the artificial intelligence unit 130 or vice versa, that is, the artificial intelligence unit 130 may be referred to as the controller 180.

Alternatively, in the present specification, the artificial intelligence unit 130 and the controller 180 may be understood as separate components. In this case, the artificial intelligence unit 130 and the controller 180 may perform various controls on the mobile terminal through data exchange with each other. The controller 180 may perform at least one function on the mobile terminal or control at least one of the components of the mobile terminal based on the result derived from the artificial intelligence unit 130. Furthermore, the artificial intelligence unit 130 may also be operated under the control of the controller 180.

The sensing unit 140 may include at least one sensor which senses at least one of internal information of the terminal, a surrounding environment of the terminal and user information.

For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output unit 152, a haptic module 153, an optical output unit 154 and the like. The display unit 151 may have an inter-layered structure or an integrated structure with a touch sensor so as to implement a touch screen. The touch screen may provide an output interface between the terminal 100 and a user, as well as functioning as the user input unit 123 which provides an input interface between the terminal 100 and the user.

The interface unit 160 may serve as an interface with various types of external devices connected with the terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The terminal 100 may execute an appropriate control associated with a connected external device, in response to the external device being connected to the interface unit 160.

In addition, the memory 170 stores data supporting various functions of the mobile terminal 100. The memory 170 may store a plurality of application programs (application programs or applications) driven in the mobile terminal 100, data for operating the mobile terminal 100, instructions, data (for example, at least one algorithm information for machine learning, and the like) for the operation of the artificial intelligence unit 130. At least some of those application programs may be downloaded from an external server via wireless communication. Some others of those application programs may be installed within the terminal 100 at the time of being shipped for basic functions of the terminal 100 (for example, receiving a call, placing a call, receiving a message, sending a message, etc.). On the other hand, the application programs may be stored in the memory 170, installed in the terminal 100, and executed by the controller 180 to perform an operation (or a function) of the terminal 100.

The controller 180 may typically control an overall operation of the terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1*a*, in order to drive the application programs stored in the memory 170. In addition, the controller 180 may drive the application programs by combining at least two of the components included in the terminal 100 for operation.

The power supply unit 190 may receive external power or internal power and supply appropriate power required for operating respective elements and components included in the terminal 100 under the control of the controller 180. The power supply unit 190 may include a battery, and the battery may be an embedded battery or a replaceable battery.

Hereinafter, each aforementioned component will be described in more detail with reference to FIG. 1A, prior to explaining various exemplary embodiments implemented by the terminal 100 having the configuration.

First, the wireless communication unit 110 will be described. The broadcast receiving module 111 of the wireless communication unit 110 may receive a broadcast signal and/or broadcast associated information from an external broadcast managing server via a broadcast channel. The broadcast channel may include a satellite channel and a terrestrial channel. At least two broadcast receiving modules 111 may be provided in the terminal 100 to simultaneously receive at least two broadcast channels or switch the broadcast channels.

The broadcast management server may mean a server that generates and transmits a broadcast signal and/or broadcast related information or a server that receives a previously generated broadcast signal and/or broadcast related information and transmits the same to a terminal. The broadcast signal may include not only a TV broadcast signal, a radio broadcast signal, and a data broadcast signal, but also a broadcast signal having a data broadcast signal combined with a TV broadcast signal or a radio broadcast signal.

The broadcast signal may be encoded according to at least one of technical standards (or broadcast methods, for example, ISO, IEC, DVB, ATSC, or the like) for transmitting and receiving digital broadcast signals, and the broadcast receiving module 111 may receive the digital broadcast signal by using a method suitable for a technical standard set by technical standards.

The broadcast related information may mean information related to a broadcast channel, a broadcast program, or a broadcast service provider. The broadcast related information may also be provided through a mobile communication network. In this case, it may be received by the mobile communication module 112.

The broadcast related information may exist in various forms such as an electronic program guide (EPG) of digital multimedia broadcasting (DMB) or an electronic service guide (ESG) of digital video broadcast-handheld (DVB-H). The broadcast signal and/or broadcast related information received through the broadcast receiving module 111 may be stored in the memory 160.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

The wireless signal may include various types of data according to transmission and reception of a voice call signal, a video telephone conversation call signal, or a text/multimedia message.

The wireless Internet module 113 denotes a module for wireless Internet access. This module may be internally or externally coupled to the terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE and the like are executed via a mobile communication network, the wireless Internet module 113 which performs the wireless Internet access via the mobile communication network may be understood as a type of the mobile communication module 112.

The short range communication module 114 denotes a module for short range communications. Suitable technologies for implementing the short range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short range communication module 114 may support wireless communications between the terminal 100 and a wireless communication system, between the terminal 100 and another terminal 100, or between the terminal and a network where another terminal 100 (or an external server) is located, via wireless personal area networks. The short range wireless communication network may be short range wireless personal area networks.

Here, the another terminal 100 may be a wearable device, for example, a smart watch, smart glasses or a head mounted display (HMD), which is able to exchange data with the terminal 100 (or to like data with the terminal 100). The short range communication module 114 may sense (recognize) a wearable device, which is able to communicate with the terminal), near the terminal 100. In addition, if the sensed wearable device is a device which is authenticated to communicate with the terminal 100 according to the present disclosure, the controller 180 may transmit at least part of data processed in the terminal 100 to the wearable device via the short range communication module 114. Hence, a user of the wearable device may use the data processed in the terminal 100 on the wearable device. For example, if a call is received in the terminal 100, the user may answer the call using the wearable device. Also, if a message is received in the terminal 100, the user may check the received message using the wearable device.

The location information module 115 denotes a module for detecting or calculating a position of the terminal. An example of the location information module 115 may include a Global Position System (GPS) module or a Wi-Fi module. For example, if the terminal uses the GPS module, a position of the terminal may be acquired using a signal sent from a GPS satellite.

As another example, if the terminal uses the Wi-Fi module, a position of the terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the terminal. As a module used to acquire the location (or current location) of the terminal, the location information module 115 may not be necessarily limited to a module for directly calculating or acquiring the location of the terminal.

Next, the input unit 120 may be configured to provide an audio or video signal (or information) input to the terminal or information input by a user to the terminal. For the input of the audio information, the terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the terminal 100 may be arranged in a matrix configuration. By use of the cameras 121 having the matrix configuration, a plurality of image information having various angles or focal points may be input into the terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the terminal 100 (or an application program being executed). On the other hand, the microphone 122 may include assorted noise removing algorithms to remove noise generated in the course of receiving the external audio signal.

The user input unit 123 may receive information input by a user. If information is input through the user input unit 123, the controller 180 may control an operation of the terminal 100 to correspond to the input information. The user input unit 123 may include a mechanical input element (or a mechanical key, for example, a button located on a front/rear surface or a side surface of the terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

On the other hand, the sensing unit 140 may sense at least one of internal information of the terminal, surrounding environment information of the terminal and user information, and generate a sensing signal corresponding to it. The controller 180 may control an operation of the terminal 100 or execute data processing, a function or an operation associated with an application program installed in the terminal based on the sensing signal. Hereinafter, description will be given in more detail of representative sensors of various sensors which may be included in the sensing unit 140.

First, a proximity sensor 141 refers to a sensor to sense presence or absence of an object approaching a surface to be sensed, or an object disposed near a surface to be sensed, by using an electromagnetic field or infrared rays without a mechanical contact. The proximity sensor 141 may be arranged at an inner region of the terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. If the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized as a proximity sensor.

On the other hand, for the sake of brief explanation, a state that the pointer is positioned to be proximate onto the touch screen without contact will be referred to as 'proximity touch,' whereas a state that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.).

On the other hand, the controller 180 may process data (or information) corresponding to the proximity touches and the proximity touch patterns sensed by the proximity sensor 141, and output visual information corresponding to the process data on the touch screen. In addition, the controller 180 may control the terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

If touch inputs are sensed by the touch sensors as described above, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using this fact. In more detail, the position of the wave generation source may be calculated by using a time difference from the time that the ultrasonic wave reaches the sensor based on the light as a reference signal.

On the other hand, the camera 121, which has been described as the configuration of the input unit 120, includes at least one of a camera sensor (for example, CCD, CMOS, or the like), a photo sensor (or an image sensor), and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the terminal 100. For example, the display unit 151 may display execution screen information of an application program driven in the terminal 100 or user interface (UI) and graphic user interface (GUI) information in response to the execution screen information.

Furthermore, the display unit 151 may also be implemented as a stereoscopic display unit for displaying stereoscopic images. The stereoscopic display unit may employ a stereoscopic display item such as stereoscopic item (a glass item), an auto-stereoscopic item (glassless item), a projection item (holographic item), or the like.

In general, a three-dimensional stereoscopic image is composed of a left image (left eye image) and a right image (right eye image). A top-down method in which the left and right images are arranged up and down in one frame according to the way in which the left and right images are merged into three-dimensional stereoscopic images, L-to-R (left-to-right, side by side) method that arranges left and right images in one frame in a left and right direction, a checker board method to arrange the pieces of the left and right images in the form of tiles, an interlaced method in which left and right images are alternately arranged in columns or rows, and a time sequential (frame by frame) method of alternately displaying left and right images by time.

In addition, a three-dimensional thumbnail image may generate a left image thumbnail and a right image thumbnail from the left image and the right image of the original image frame, respectively, and may be generated as one image as they are merged. In general, a thumbnail refers to a reduced image or a reduced still image. The left image thumbnail and the right image thumbnail generated as described above are displayed with a left and right distance difference on the screen by a depth corresponding to the parallax of the left image and the right image, and thus it can exhibit a stereoscopic sense of space.

The left image and the right image necessary for implementing the three-dimensional stereoscopic image may be displayed on the stereoscopic display unit by the stereoscopic processing unit. The stereoscopic processing unit receives 3D images (images of the base view and images of the extended view) and sets left and right images therefrom, or receives 2D images and converts 2D images into left and right images.

The audio output unit 152 may output audio data received from the wireless communication unit 110 or stored in the memory 170 in a call signal reception mode, a call mode, a record mode, a voice recognition mode, a broadcast reception mode, and the like. Also, the audio output unit 152 may also provide audible output signals related to a particular function (e.g., a call signal reception sound, a message reception sound, etc.) performed by the terminal 100. The audio output unit 152 may include a receiver, a speaker, a buzzer or the like.

A haptic module 153 may generate various tactile effects that can be felt by a user. A representative example of tactile effect generated by the haptic module 153 may be vibration. The intensity, pattern and the like of vibration generated by the haptic module 153 may be controlled by a user's selection or the settings of the controller. For example, the haptic module 153 may output different vibrations in a combined manner or in a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the terminal 100.

An optical output unit 154 may output a signal for indicating an event generation using light of a light source. Examples of events generated in the terminal 100 may include a message reception, a call signal reception, a missed call, an alarm, a schedule notice, an email reception, an information reception through an application, and the like.

A signal output by the optical output unit 154 may be implemented in such a manner that the terminal emits monochromatic light or light with a plurality of colors. The signal output may be terminated as the terminal senses a user's event checking.

The interface unit 160 may serve as an interface with every external device connected with the terminal 100. For example, the interface unit 160 may receive data transmitted from an external device, receive power to transfer to each element within the terminal 100, or transmit internal data of the terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

Furthermore, if the terminal 100 is connected with an external cradle, the interface unit 160 may serve as a passage to allow power from the cradle to be supplied to the terminal 100 therethrough or may serve as a passage to allow various command signals input by the user from the cradle to be transferred to the terminal therethrough. Various command signals or power input from the cradle may operate as signals for recognizing that the terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the terminal 100 may be operated in relation to a web storage device that performs the storage function of the memory 170 over the Internet or other network.

As aforementioned, the controller 180 may typically control the general operations of the terminal 100. For example, the controller 180 may set or release a lock state for restricting a user from inputting a control command with respect to applications if a state of the terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or a combination of those components in order to implement various exemplary embodiments disclosed herein.

The power supply unit 190 may receive external power or internal power and supply appropriate power required for operating respective elements and components included in the terminal 100 under the control of the controller 180. The power supply unit 190 may include a battery. The battery may be an embedded battery which is rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1b and 1c, the terminal 100 disclosed herein may be implemented using a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of terminal or on a specific type of terminal will be also typically applied to another type of terminal.

Herein, the terminal body may be understood as a concept that refers to the mobile terminal 100 as at least one aggregate.

The terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102.

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, if the rear cover 103 is detached from the rear case 102, the electronic components mounted to the rear case 102 may be externally exposed.

As illustrated, if the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the terminal 100 may be configured such that one case forms the inner space. In this example, a terminal 100 having a uni-body formed in such a manner that synthetic resin or metal extends from a side surface to a rear surface may also be implemented.

On the other hand, the terminal 100 may include a waterproofing unit (not illustrated) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space if those cases are coupled.

The terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1b and 1c.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the terminal 100. For example, the display unit 151 may display execution screen information of an application program driven in the terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented using two or more displays. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. If a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not illustrated) on a rear surface of the window 151a or patterned directly on the rear surface of the window 151a. Alternatively, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the terminal 100.

The optical output module 154 may output light for indicating an event generation. Examples of the event generated in the terminal 100 may include a message reception, a call signal reception, a missed call, an alarm, a schedule notice, an email reception, information reception through an application, and the like. If a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the terminal 100. The first and second manipulation units 123a and 123b may also be commonly referred to as a manipulating portion, and may employ any method if it is a tactile manner allowing the user to perform manipulation with a tactile feeling such as touch, push, scroll or the like. In addition, the first and second manipulation units 123a and 123b may be employed in such a manner that the first and second manipulation units 123a and 123b are operated without a tactile feeling by the user through proximity touch, hovering touch, or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not illustrated) may be disposed on the rear surface of the terminal body. The rear input unit may be manipulated by a user to input a command for controlling an operation of the terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger if the user grabs the terminal body with one hand. However, the present disclosure may not be limited to this, and the position of the rear input unit may be changeable.

If the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, if the first manipulation unit 123a is not disposed on the front surface of the terminal body, the display unit 151 may be implemented to have a larger screen.

On the other hand, the terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' If the second camera 121b is implemented as the array camera, images may be captured in various manners using the plurality of lenses and images with better qualities may be obtained.

A flash 124 may be disposed adjacent to the second camera 121b. If an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a, and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1a) for supplying power to the terminal 100 may be disposed on the terminal body. The power supply unit 190 may include a battery which is mounted in the terminal body or detachably coupled to an outside of the terminal body.

The battery may receive power via a power source cable connected to the interface unit 160. Also, the battery may be (re)chargeable in a wireless manner using a wireless charger. The wireless charging may be implemented by magnetic induction or electromagnetic resonance (magnetic resonance method).

On the other hand, the drawing illustrates that the rear cover 103 is coupled to the rear case 102 for shielding the battery, so as to prevent separation of the battery and protect the battery from an external impact or foreign materials. If the battery is detachable from the terminal body, the rear case 103 may be detachably coupled to the rear case 102.

An accessory for protecting an appearance or assisting or extending the functions of the terminal 100 may further be provided on the terminal 100. As one example of the accessory, a cover or pouch for covering or accommodating at least one surface of the terminal 100 may be provided. The cover or pouch may cooperate with the display unit 151 to extend the function of the terminal 100. Another example of the accessory may be a touch pen for assisting or extending a touch input onto a touch screen.

Meanwhile, in the present invention, the information processed by the mobile terminal can be displayed using a flexible display. Hereinafter, this will be described in more detail with reference to the accompanying drawings.

Figure 2:
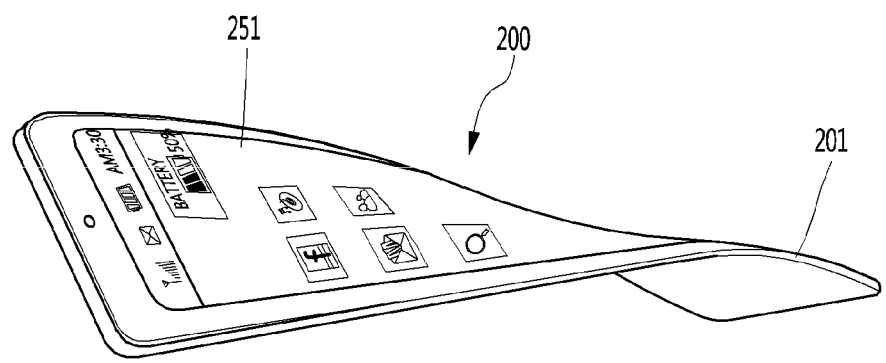
FIG. 2 is a conceptual diagram illustrating another example of a deformable mobile terminal according to the present invention.

FIG. 2 is a conceptual diagram illustrating another example of a deformable mobile terminal according to the present invention.

In this figure, mobile terminal 200 is illustrated having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1a-1c.

A general flexible display is a lightweight, non-fragile display that is built on a thin and flexible substrate that can be warped, bent, folded, twisted or curled like a paper while maintaining the characteristics of a conventional flat panel display.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

If in a state that the flexible display unit 251 is not deformed (for example, in a state with an infinite radius of curvature and referred to as a first state), a display region of the flexible display unit 251 includes a generally flat surface. If in a state that the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, if an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. If a touch is received at the flexible touch screen, the controller 180 can execute certain control corresponding to the touch input. In general, the flexible touch screen is configured to sense touch and other input while in both the first and second states.

On the other hand, One option is to configure the mobile terminal 200 to include a deformation sensing means which senses the deforming of the flexible display unit 251. The deformation sensing means may be included in the sensing unit 140 (see FIG. 1a).

The deformation sensing means may be provided in the flexible display unit 251 or the case 201 to sense information related to the deformation of the flexible display unit 251. Herein, the information related to the deformation may include a direction in which the flexible display unit 251 is deformed, a degree of deformation, a deformation position, a deformation time, and an acceleration in which the deformed flexible display unit 251 is restored. In addition, due to the warping of the flexible display unit 251 the information related to the deformation may be a variety of information that can be detected.

In addition, controller 180 can change information displayed on the flexible display unit 251, or generate a control signal for controlling a function of the mobile terminal 200, based on the information related to the deforming of the flexible display unit 251 sensed by the deformation sensing means.

Meanwhile, the mobile terminal 200 is illustrated having a case 201 for accommodating the flexible display unit 251. The case 201 can be deformable together with the flexible display unit 251 by the outside force, considering the characteristics of the flexible display unit 251.

A battery (not illustrated in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like. Hereinafter, examples of the mobile terminal extended to the wearable device will be described.

A typical wearable device can exchange data with (or cooperate with) another mobile terminal 100. In such a device, the wearable device generally has functionality that is less than the cooperating mobile terminal. For instance, the short range communication module 114 of a mobile terminal 100 may sense or recognize a wearable device that is near-enough to communicate with the mobile terminal. In addition, if the sensed wearable device is a device which is authenticated to communicate with the mobile terminal 100, the controller 180 may transmit data processed in the mobile terminal 100 to the wearable device via the short range communication module 114, for example. Hence, a user of the wearable device can use the data processed in the mobile terminal 100 on the wearable device. For example, if a call is received in the mobile terminal 100, the user can answer the call using the wearable device. Also, if a message is received in the mobile terminal 100, the user can check the received message using the wearable device.

Figure 3:
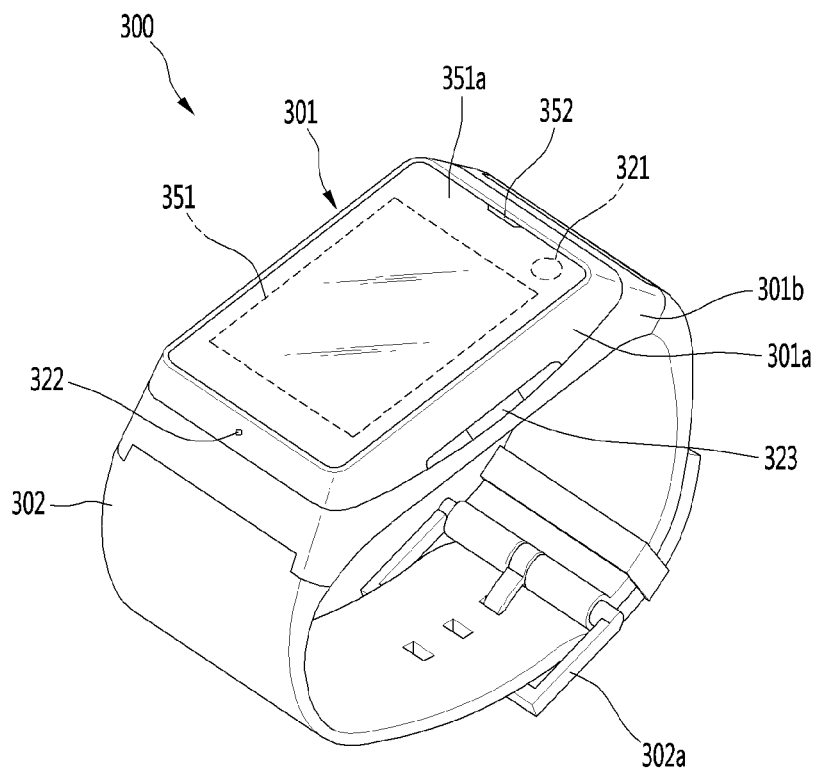
FIG. 3 is a perspective view illustrating an example of a watch-type mobile terminal related to another embodiment of the present invention.

FIG. 3 is a perspective view illustrating one example of a watch-type mobile terminal 300 in accordance with another exemplary embodiment.

As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1a-1c.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is illustrated located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. If the display unit 351 is implemented as a touch screen, additional function keys may be minimized or eliminated. For example, if the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not illustrated) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302*a* is implemented using a buckle.

Figure 4:
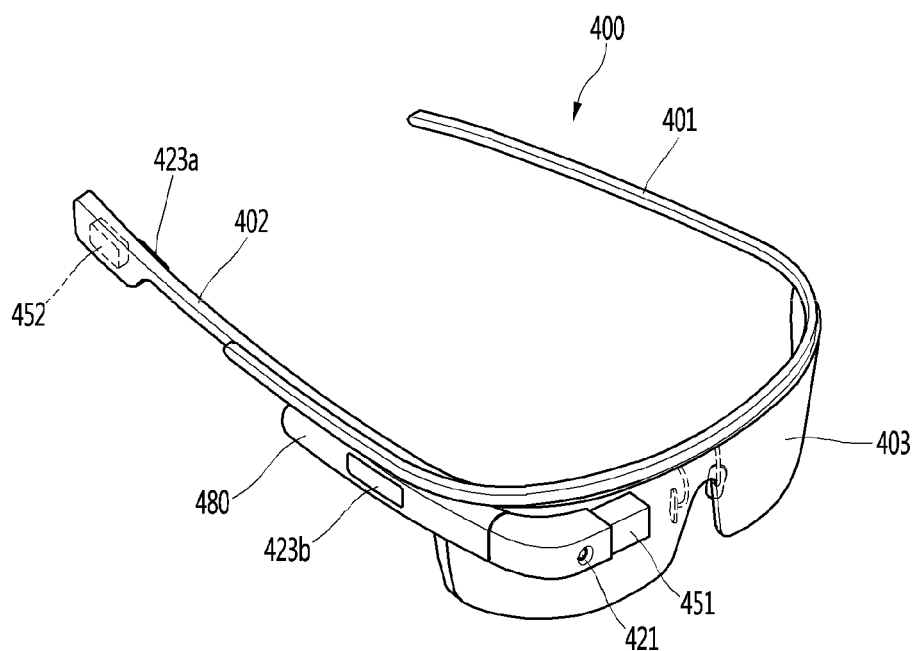
FIG. 4 is a perspective view illustrating an example of a glass-type mobile terminal related to another embodiment of the present invention.

FIG. 4 is a perspective view illustrating one example of a glass-type mobile terminal 400 according to another exemplary embodiment.

The glass-type mobile terminal 400 can be wearable on a head of a human body and provided with a frame (case, housing, etc.) therefor. The frame may be made of a flexible material to be easily worn. The frame of mobile terminal 400 is illustrated having a first frame 401 and a second frame 402, which can be made of the same or different materials. In general, mobile terminal 400 may be configured to include features that are the same or similar to that of mobile terminal 100 of FIGS. 1*a*-1*c*.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes if the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing.

In this figure, the camera 421 is provided in the control module 480 but is not necessarily limited thereto. The camera 421 may be installed in the frame portion or may be provided in plural to acquire a stereoscopic image.

The glass-type mobile terminal 400 may include user input units 423*a* and 423*b*, which can each be manipulated by the user to provide an input. The user input units 423*a* and 423*b* may employ techniques which permit input via a tactile input. Typical tactile inputs include a touch, push, or the like. The user input units 423*a* and 423*b* are illustrated operable in a pushing manner and a touching manner as they are located on the frame part and the control module 480, respectively.

In addition, the glass-type mobile terminal 400 may include a microphone (not illustrated) which processes input sound into electric audio data, and an audio output module 452 for outputting audio. The audio output module 452 may be configured to produce audio in a general audio output manner or an osteoconductive manner. If the audio output module 452 is implemented in the osteoconductive manner, the audio output module 452 may be closely adhered to the head if the user wears the mobile terminal 400 and vibrate the user's skull to transfer sounds.

Next, a communication system that can be implemented through the mobile terminal 100 according to the present invention will be described.

Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like. Hereinafter, By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

In addition, the CDMA wireless communication system may be associated with a global positioning system (GPS) for identifying the location of the mobile terminal 100. The satellite 300 helps to locate the mobile terminal 100. The useful position information may be obtained with greater or fewer satellites than two satellites. Here, the location of the mobile terminal 100 may be tracked using all the technologies capable of tracking the location as well as the GPS tracking technology. In addition, at least one of the GPS satellites may optionally or additionally be responsible for satellite DMB transmission.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. Furthermore, the GPS module can acquire speed information in real time to calculate a current position. Sometimes, accuracy of a measured position may be compromised if the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server.

The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. The location information of the mobile terminal 100 is extracted (or analyzed) by comparing the included information with the received wireless AP information.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold if the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal.

Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

A typical NFC module provided at the mobile terminal supports short range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

If the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Hereinafter, a method of operating the mobile terminal 100 according to an embodiment of the present invention is described.

Hereinafter, the mobile terminal 100 may be referred to as an artificial intelligence device.

Figure 5:
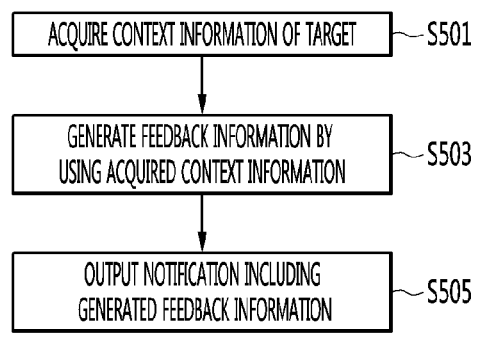
FIG. 5 is a flowchart illustrating a method of operating a mobile terminal according to an embodiment of the present invention.

FIG. 5 is a flowchart illustrating a method of operating a mobile terminal according to an embodiment of the present invention.

The artificial intelligence unit 130 of the artificial intelligence device 100 acquires context information of the target through the input unit 120 (S501).

In one embodiment, the target may be one or more of a user and an object located around the artificial intelligence device 100.

In another embodiment, in a case where the artificial intelligence device 100 is disposed in a vehicle, the target may be one or more of a person or an object located near the vehicle.

In an embodiment, the context information of the target may include one or more of a location of the target, a direction of the target, sound output from the target, the attributes of the target, and an action currently taken by the target.

The attributes of the target may include one or more of the age of the target and the gender of the target.

In one embodiment, more than one target may be selected. For example, in a case where a plurality of users exist around the mobile terminal 100, the plurality of users may be targets.

In an embodiment, the artificial intelligence unit 130 may acquire an image through the camera 121 included in the input unit 120.

In another embodiment, the artificial intelligence unit 13 may acquire a voice through the microphone 122 included in the input unit 120.

In another embodiment, the artificial intelligence unit 130 may acquire an image through the camera 121 and a voice through the microphone 122, respectively.

The artificial intelligence unit 130 may acquire context information of the target by using one or more of an image acquired through the camera 121 or a voice acquired through the microphone 122.

The artificial intelligence unit 130 generates feedback information using the acquired context information (S503).

In one embodiment, the feedback information may be information that provides a response to the target or another target related to the target based on context information of the target.

In another embodiment, the feedback information may include a predicted result of the context thereafter with respect to the target.

The artificial intelligence unit 130 may determine the output volume intensity of the feedback information according to the acquired context information.

According to an embodiment, in a case where the intensity of the voice input through the microphone 122 is less than the preset intensity, the artificial intelligence unit 130 may determine the output volume intensity of the feedback information as an intensity smaller than the preset volume intensity.

Here, the input voice may be a voice other than the voice of the target. In other words, the input voice may represent noise.

According to another embodiment, the artificial intelligence unit 130, the intensity of the voice input through the microphone 122 is the preset intensity or less, in a case where there is no target movement, the output volume intensity of the feedback information can be determined as intensity smaller than the preset volume intensity.

In a case where the artificial intelligence unit 130 acquires the second context information indicating that the intensity of the sound input through the microphone 122 is equal to or greater than the preset intensity, the artificial intelligence unit 130 can determine the output volume intensity of the feedback information to be greater than the preset volume intensity.

The controller 180 outputs a notification including the generated feedback information (S505).

According to an embodiment, the controller 180 may receive a command to output feedback information from the artificial intelligence unit 130, and output the feedback information through the output unit 150 according to the received command.

According to an embodiment, the controller 180 may adjust the output volume of the notification according to the acquired context information.

According to another embodiment, the controller 180 may change a method of outputting a notification according to the acquired context information.

Hereinafter, various embodiments of outputting feedback information using context information acquired according to an embodiment of the present disclosure will be described.

In addition, the other artificial intelligence device 100 described below may also include all components of the mobile terminal 100 described with reference to FIG. 1.

Figure 6A:
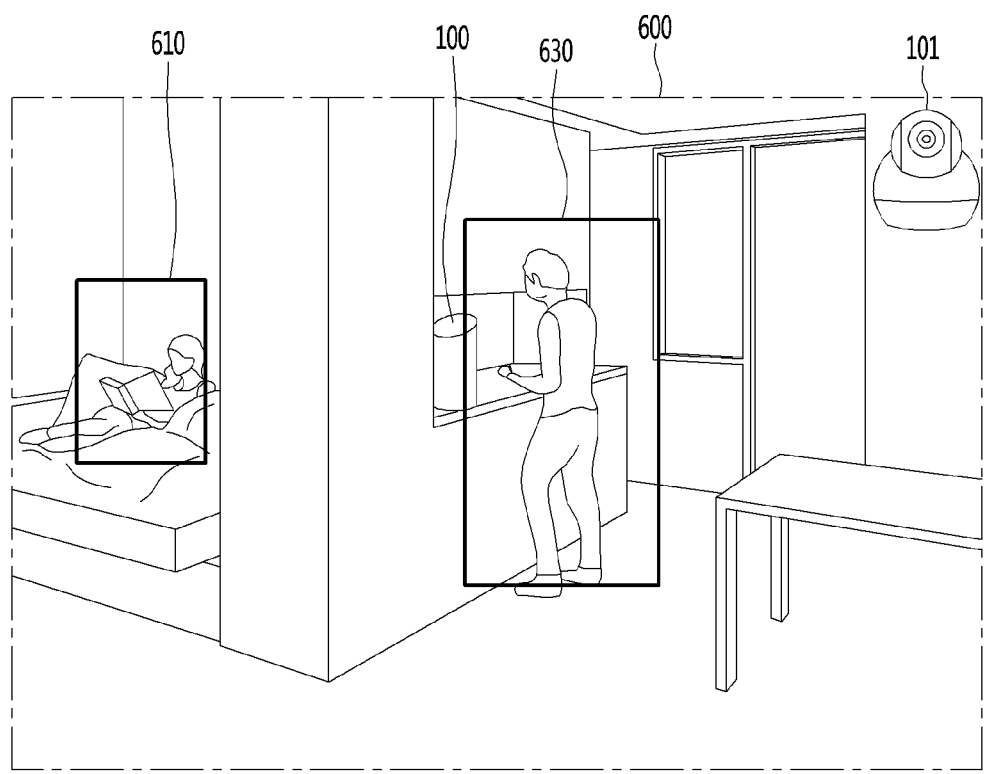
FIGS. 6a to 6c are diagrams for explaining an example of outputting feedback information in different ways by using context information of a target according to one embodiment of the present invention.
Figure 6B:
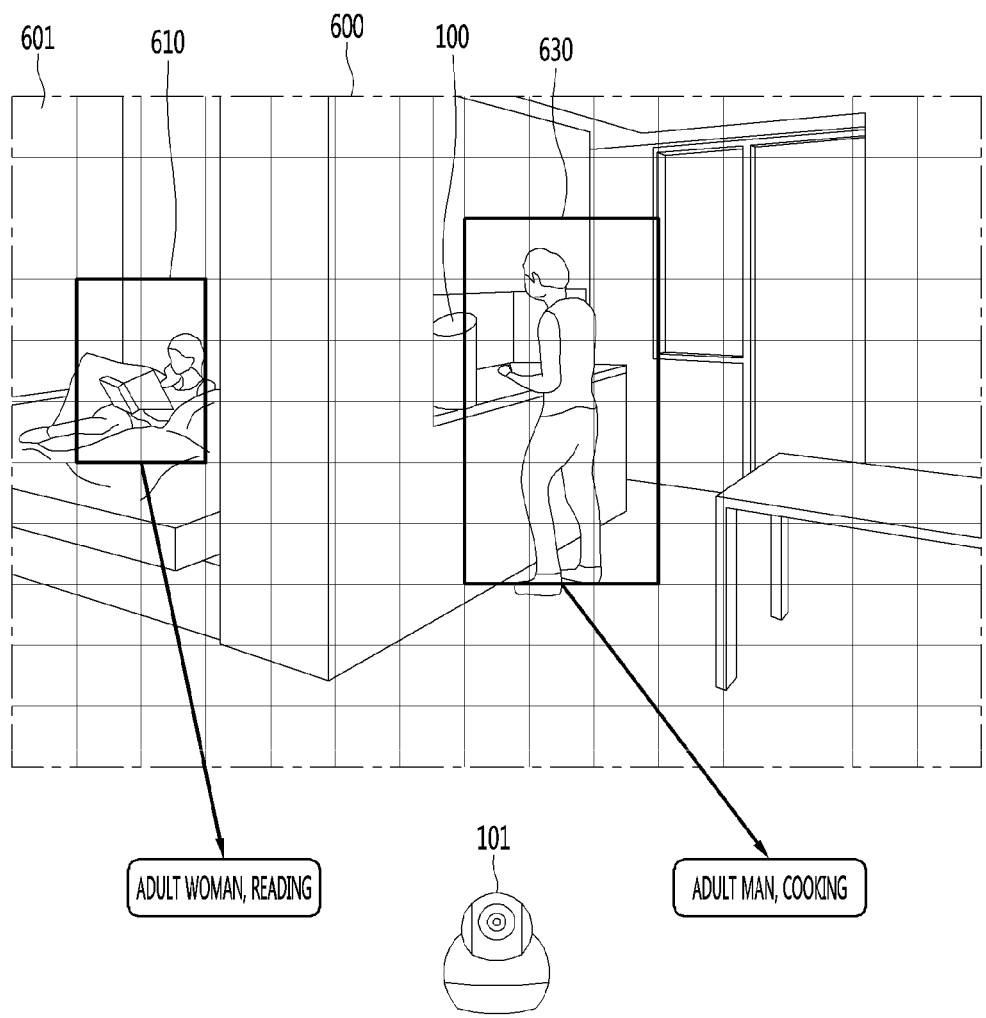
Figure 6C:
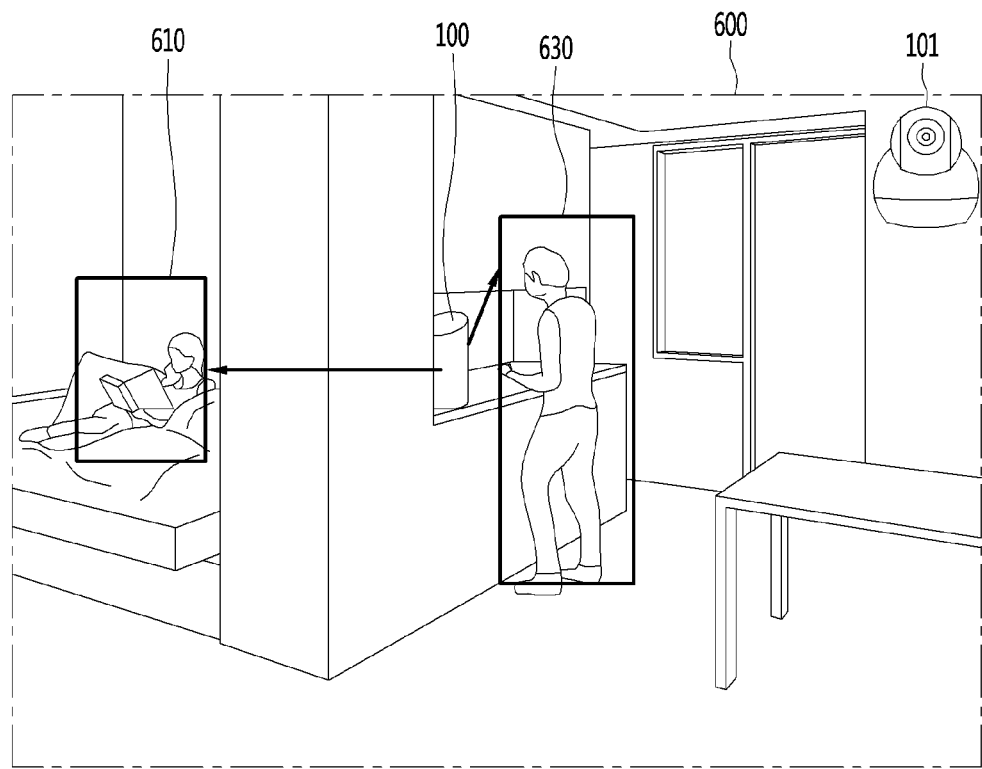

FIGS. 6a to 6c are diagrams for explaining an example of outputting feedback information in different ways by using context information of a target according to one embodiment of the present invention.

In FIGS. 6a to 6c, it is assumed that the second user is cooking food according to a cooking recipe provided by the artificial intelligence device 100.

Referring to FIG. 6a, the camera 101 provided separately from the artificial intelligence device 100 may acquire an image 600 of the surroundings of the artificial intelligence device 100.

The short range communication module 114 of the artificial intelligence device 100 may receive the image 600 from the camera 101.

The artificial intelligence unit 130 may acquire context information about one or more targets by using the acquired image 600.

In an embodiment, as illustrated in FIG. 6b, the artificial intelligence unit 130 divides the image 600 into a plurality of unit areas, and through the divided plurality of unit areas, extracts the first user image 610 and a second user image 630.

The size of each of the plurality of unit areas may be the same.

The artificial intelligence unit 130 may determine whether there is one completed object in the plurality of unit areas, and extract the first user image 610 and the second user image 630 according to the determination result.

The artificial intelligence unit 130 may acquire context information of the first user by using the first user image 610. The artificial intelligence unit 130 may acquire one or more of an action of the first user, a location of the first user, and the attributes of the first user through the first user image 610.

For example, the artificial intelligence unit 130 may confirm that the first user is the wife of the home and is reading through the first user image 610.

The artificial intelligence unit 130 uses the known face recognition technique, and in a case where the face of the first user included in the first user image 610 coincides with the wife's face image stored in the memory 170, the artificial intelligence unit 130 can be confirmed that the first user is a wife.

In addition, the artificial intelligence unit 130 may determine that the first user is reading in a case where the first user image 610 matches the reading action image stored in the memory 170 by a certain amount or more.

The artificial intelligence unit 130 may acquire context information of the second user by using the second user image 630.

The artificial intelligence unit 130 may acquire context information of the second user by using the second user image 630. The artificial intelligence unit 130 may acquire one or more of an action of the second user, a location of the second user, and the attributes of the second user through the second user image 630.

In other words, the context information of the second user may include one or more of an action of the second user, a location of the second user, and the attributes of the second user.

For example, the artificial intelligence unit 130 may identify, through the second user image 610, that the second user is a husband of a home and is cooking.

In a case where the face of the second user included in the second user image 630 matches the face image of the husband stored in the memory 170, the artificial intelligence unit 130 uses a known face recognition technology and can confirm that the second user is a husband.

In addition, the artificial intelligence unit 130 may determine that the second user is cooking in a case where the second user image 630 matches the cooking action image stored in the memory 170 by a certain amount or more. As another example, since the artificial intelligence unit 130 is outputting information on the cooking recipe, the artificial intelligence unit 130 may determine that the second user is cooking.

In an embodiment, the artificial intelligence unit 130 may generate first feedback information corresponding to the context information of the first user by using the context information of the first user and the context information of the second user.

The artificial intelligence unit 130 may predict that the context of the first user is waiting for food because the context of the first user is reading and the context of the second user is cooking.

In an embodiment, the artificial intelligence unit 130 may generate feedback information including the time remaining until the food is completed, and transmit the feedback information to the mobile terminal owned by the first user. In other words, by this, the reading of the first user is not disturbed.

The artificial intelligence unit 130 may change the sound output method to a text message transmission method if the existing notification method is output through the sound output unit 152.

In another embodiment, the artificial intelligence unit 130 may output the time remaining until the food is completed through the sound output unit 152 at the volume lower than the preset volume in the direction in which the first user is located. In other words, by this, the reading of the first user is not disturbed.

The artificial intelligence unit 130 may generate second feedback information including the content of the next recipe step by using the context information of the second user.

The artificial intelligence unit 130 may recognize a recipe step performed by the second user and generate second feedback information including content of the next recipe step.

The artificial intelligence unit 130 may output the generated second feedback information as a sound greater than a preset volume in a direction in which the second user is located.

As such, according to an embodiment of the present disclosure, information may be automatically provided according to a target context, and user convenience may be maximized.

Figure 7A:
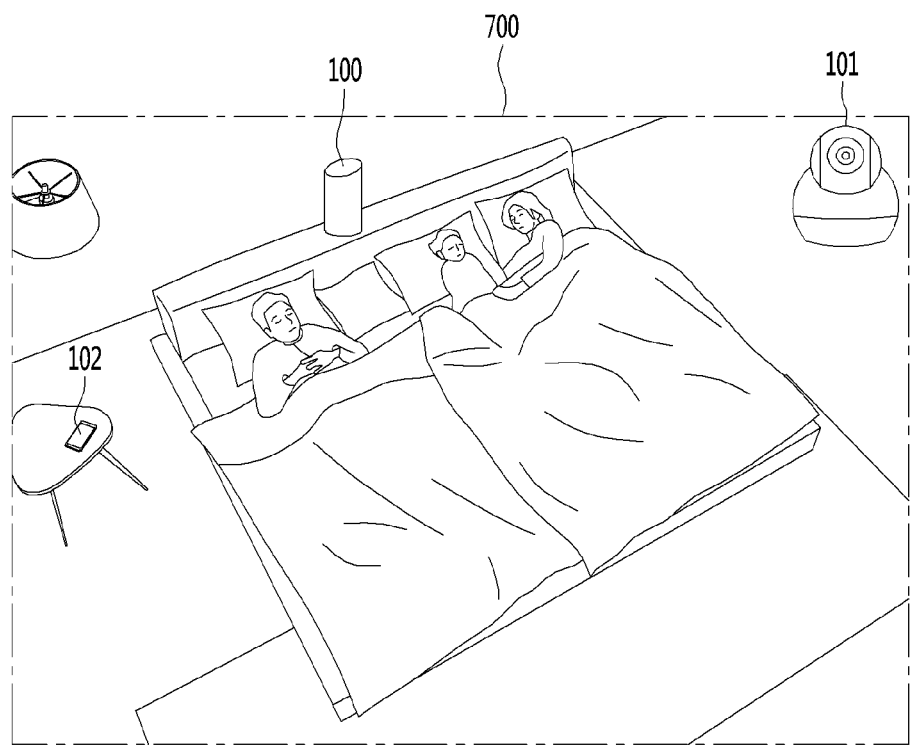
FIGS. 7a to 7c are diagrams for explaining an example of outputting feedback information by using context information of a target according to another embodiment of the present invention.
Figure 7B:
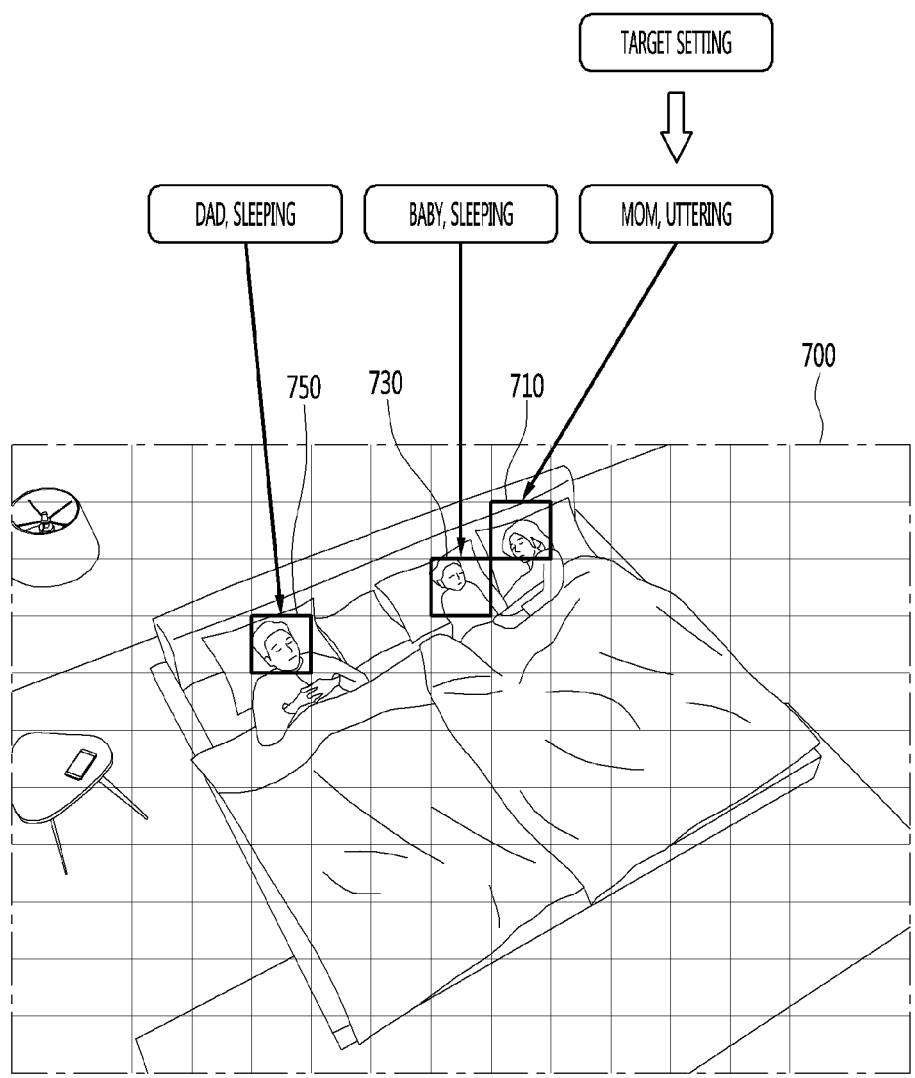
Figure 7C:
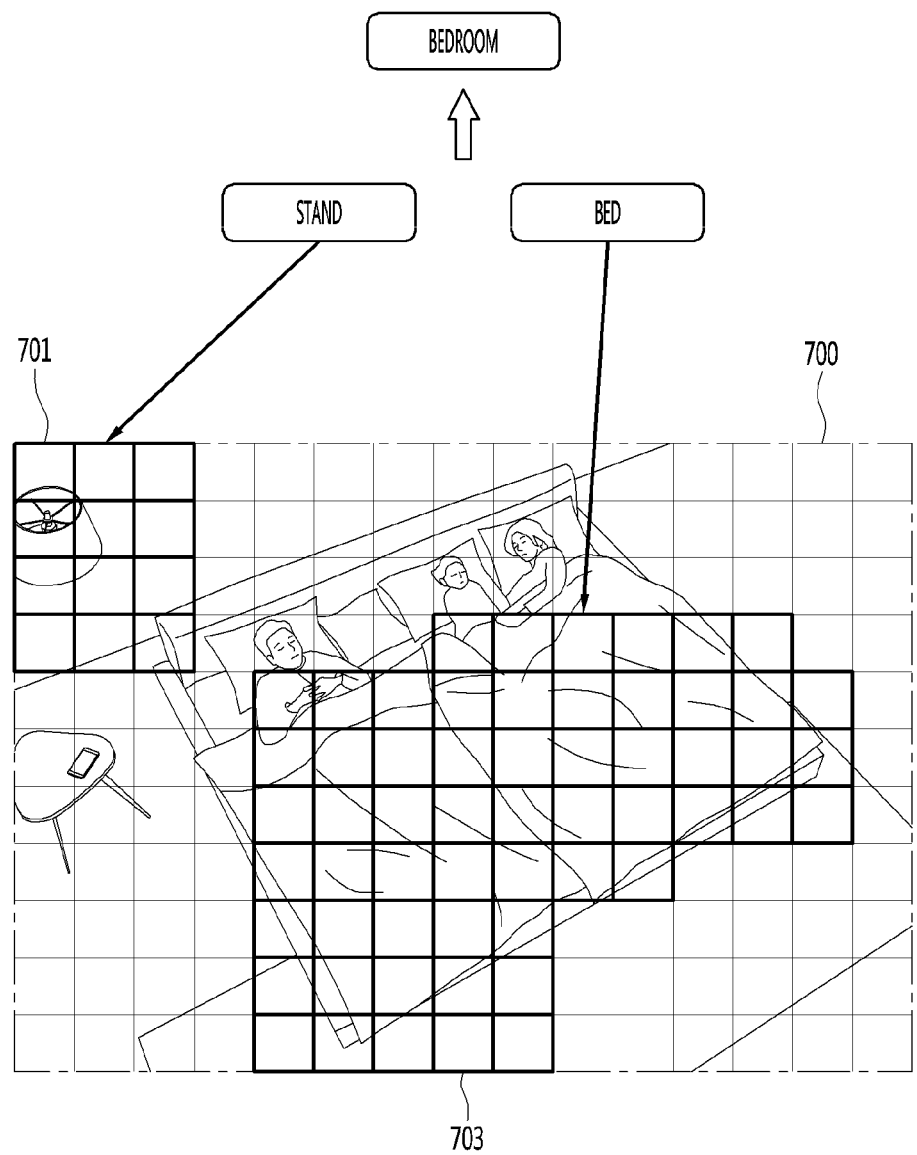

FIGS. 7a to 7c are diagrams for explaining an example of outputting feedback information by using context information of a target according to another embodiment of the present invention.

In FIGS. 7a to 7c, it is assumed that the artificial intelligence device 100 is wirelessly paired with the mobile terminal 102 and the camera 101 of the first user.

In other words, the artificial intelligence device 100, the mobile terminal 102 of the first user, and the camera 101 may communicate with each other wirelessly to exchange information with each other.

Referring to FIG. 7a, the artificial intelligence unit 130 of the artificial intelligence device 100 can receive an image 700 imaged by the camera 101 from the camera 101.

In addition, the artificial intelligence unit 130 may determine who is an utterer based on the acquired image 700.

The artificial intelligence unit 130 may set a target to provide feedback information among a plurality of users included in the image 700.

As illustrated in FIG. 7b, the artificial intelligence unit 130 may extract the plurality of user images 710, 730, and 750 from image 700 by using a face recognition technique.

The artificial intelligence unit 130 may set a first user corresponding to the first user image 710 which is uttering among the plurality of user images 710, 730, and 750 as a target. In this case, the artificial intelligence unit 130 may recognize that the second and third users are sleeping.

After setting the target for providing the feedback information, the artificial intelligence unit 130 may acquire the surrounding context information of the first user through segmentation of the image 700 as illustrated in FIG. 7c.

The artificial intelligence unit 130 may recognize a stand existing in the first divided area 701 of the image 700 and a bed existing in the second divided area 703 to recognize that the first user is in a sleeping state.

In a case where the mobile terminal 102 owned by the first user receives the notification, the artificial intelligence unit 130 may output the notification received by the mobile terminal 102 to a volume lower than a preset volume level toward a direction of the first user.

This is to avoid disturbing the sleep of other second and third users.

According to another embodiment, the artificial intelligence device 100 may acquire target setting and context information of the target, and provide feedback information to the target.

In this case, the artificial intelligence device 100 may receive the image 700 from the camera 101, and set a target, acquire context information of the target, and output feedback information to the target, based on the received image 700.

Figure 8A:
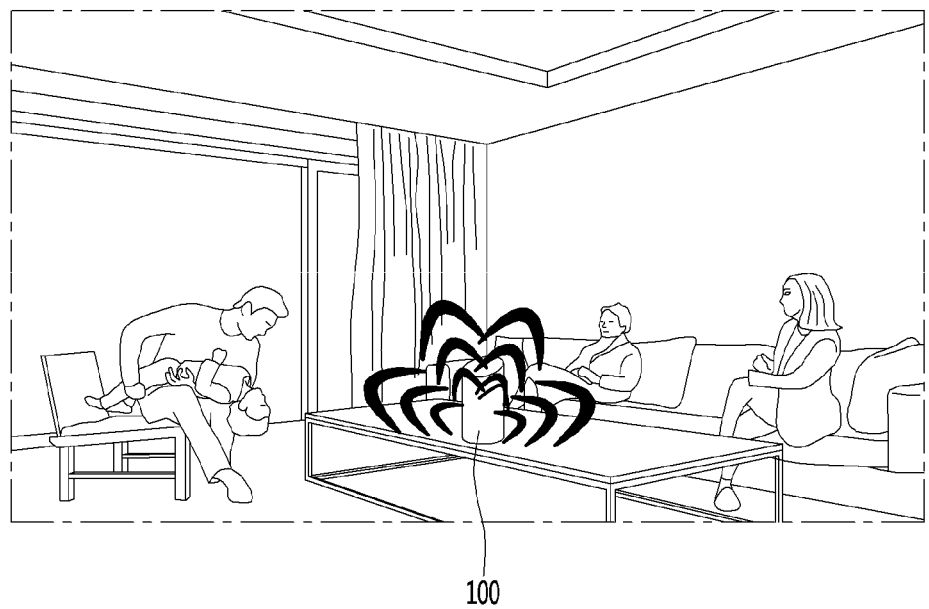
FIGS. 8A to 8C are diagrams illustrating an example of providing the feedback information corresponding to context information of a target acquired to another target according to an embodiment of the present invention.
Figure 8B:
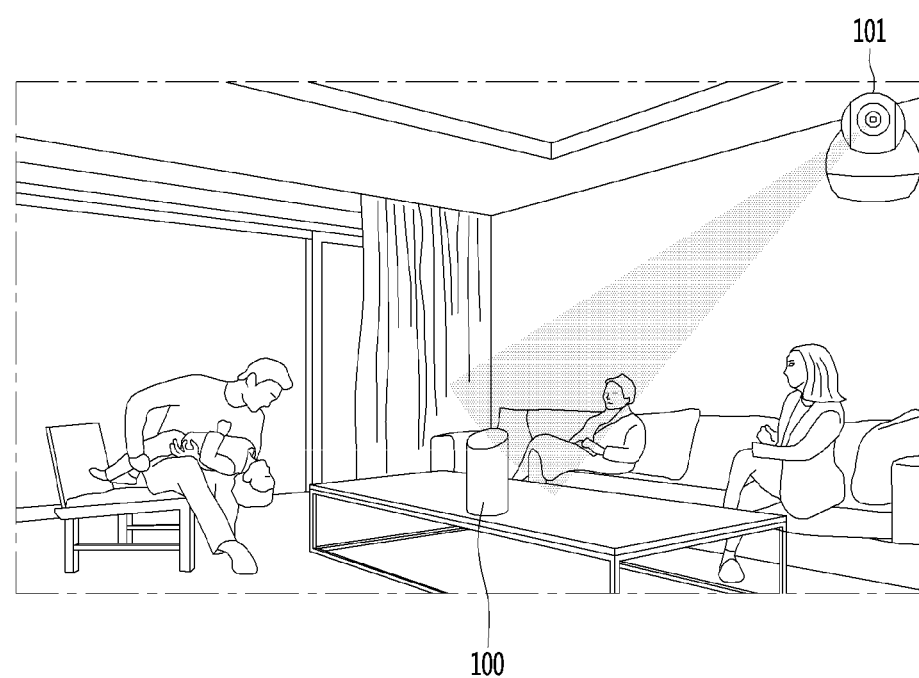
Figure 8C:
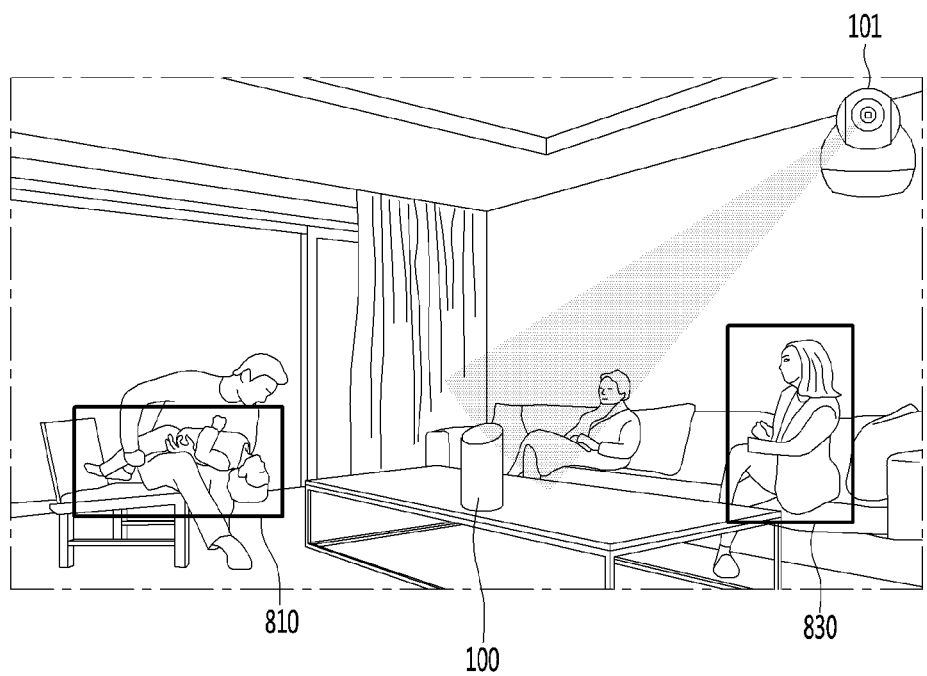

FIGS. 8A to 8C are diagrams illustrating an example of providing the feedback information corresponding to context information of a target acquired to another target according to an embodiment of the present invention.

Referring to FIG. 8a, the artificial intelligence device 100 may determine the direction of the utterer and the distance between the artificial intelligence device 100 and the utterer by using the volume of the voice spoken by the utterer.

In detail, the artificial intelligence unit 130 may receive an utterer's voice using a directional microphone (not illustrated).

The artificial intelligence unit 130 may acquire the volume, which is the size of the voice of the received utterer, and the direction of the voice.

The artificial intelligence unit 130 may generate feedback information according to the volume and direction of the acquired utterer voice and may output the generated feedback information through the sound output unit 153.

Next, FIG. 8b will be described.

The artificial intelligence unit 130 may acquire context information of the target by using the voice of the utterer received by the directional microphone (not illustrated) and the image acquired by the camera 121 of the other artificial intelligence device 100.

The artificial intelligence unit 130 may determine the location of the utterer based on the acquired utterer's voice.

The artificial intelligence unit 130 may transmit a command to move the camera 121 in the direction of the location of the utterer, which is recognized by the other artificial intelligence device 100.

Thereafter, the artificial intelligence unit 130 may recognize a context around the utterer acquired as the camera 121 moves.

The artificial intelligence unit 130 may generate feedback information corresponding to a context around the recognized utterer and output the generated feedback information in the direction of the utterer.

Next, FIG. 8c will be described.

FIG. 8c is a diagram for explaining an example in which a listening target is set according to the utterer's utterance content in a case where the utterer and the listener are different, and output feedback information to the set listening target.

Referring to FIG. 8c, the artificial intelligence device 100 may receive an utterance voice by the utterer 810.

The artificial intelligence device 100 may recognize the utterance content on the basis of the received voice of the utter. The artificial intelligence device 100 may convert the voice of the utterer into text and recognize the utterance content.

The artificial intelligence device 100 may set a listening target according to the recognized utterance content. For example, in a case where the utter is a son and the utterance content is that <Ask your mom if you can buy a comic book, if you do, please buy me>, the artificial intelligence device 100 may set the listening target as a mother.

The artificial intelligence device 100 may confirm whether there is a mother set as a listening target in the home by analyzing the image acquired through the camera 121.

The artificial intelligence device 100 may output feedback information in a direction where the listening target is located, in a case where the listening target exists in the home.

The artificial intelligence device 100 may output the feedback information through the sound output unit 152.

The artificial intelligence device 1010 may transmit feedback information to the mobile terminal of the listening target in a case where the listening target is not in the home. Here, the feedback information may be prediction information suitable for the utterance content, such as <the son asked to buy a comic book>.

Figure 9:
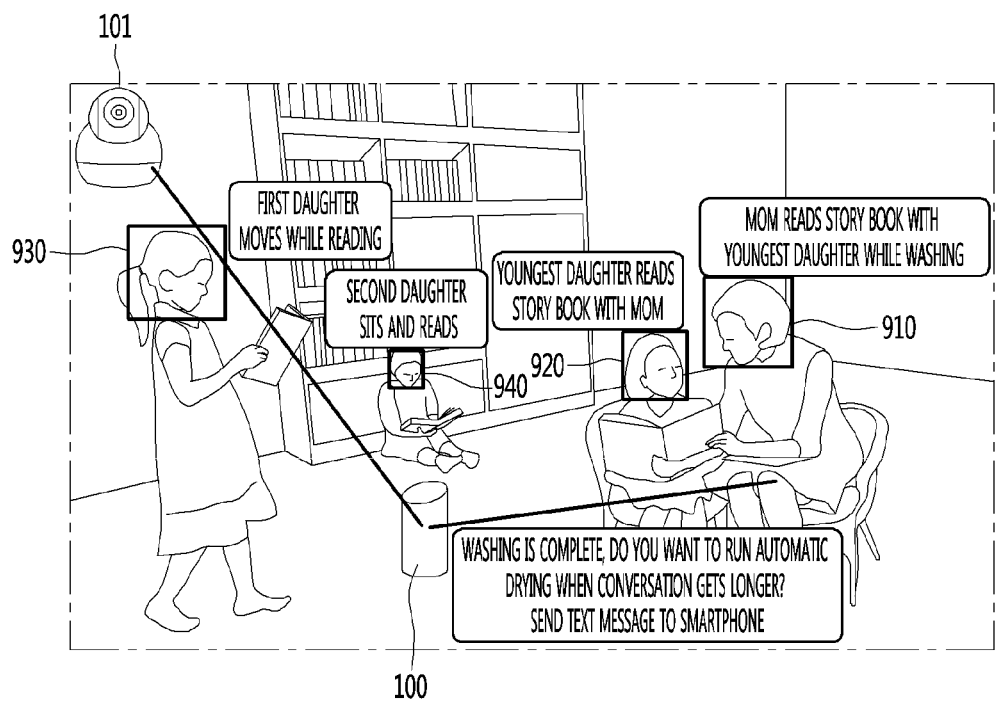
FIG. 9 is a diagram for explaining an example of adjusting an output volume of feedback information or changing a notification method of feedback information according to context information of a target according to another embodiment of the present invention.

FIG. 9 is a diagram for explaining an example of adjusting an output volume of feedback information or changing a notification method of feedback information according to context information of a target according to another embodiment of the present invention.

Referring to FIG. 9, the artificial intelligence device 100 may receive an image of the surroundings of the artificial intelligence device 100 through the camera 101.

The artificial intelligence device 100 may set any one user among the plurality of users 910, 920, 930, and 940 included in the image as a target.

For example, the artificial intelligence device 100 may set the oldest user 910 as a target through face recognition among the plurality of users 910, 920, 930, and 940.

As another example, the artificial intelligence device 100 may set a preset user 910 among a plurality of users 910, 920, 930, and 940 as a target.

The artificial intelligence device 100 may determine that the user 910 which is set as a target is reading with another user 920 (the youngest daughter) through image analysis through the camera 101.

The artificial intelligence device 100 may adjust the size of the output voice of the feedback information according to the identified context information. For example, the artificial intelligence device 100 may recognize that the user has started a washing machine and washing has been completed.

The artificial intelligence device 100 may complete the washing according to the recognized context, and output feedback information including an inquiry to execute the automatic drying of the laundry.

At this time, the artificial intelligence device 100 may recognize that the user 910 which is set as the target does not want to be disturbed, and may lower the size of the voice output of the feedback information or change the output method of the feedback information.

For example, if the artificial intelligence device 100 previously outputs feedback information through the sound output unit 152, the artificial intelligence device 100 may transmit a text message to the mobile terminal of the user 910 in the form of a text message.

Accordingly, the user may not be disturbed in the concentration of work.

Figure 10:
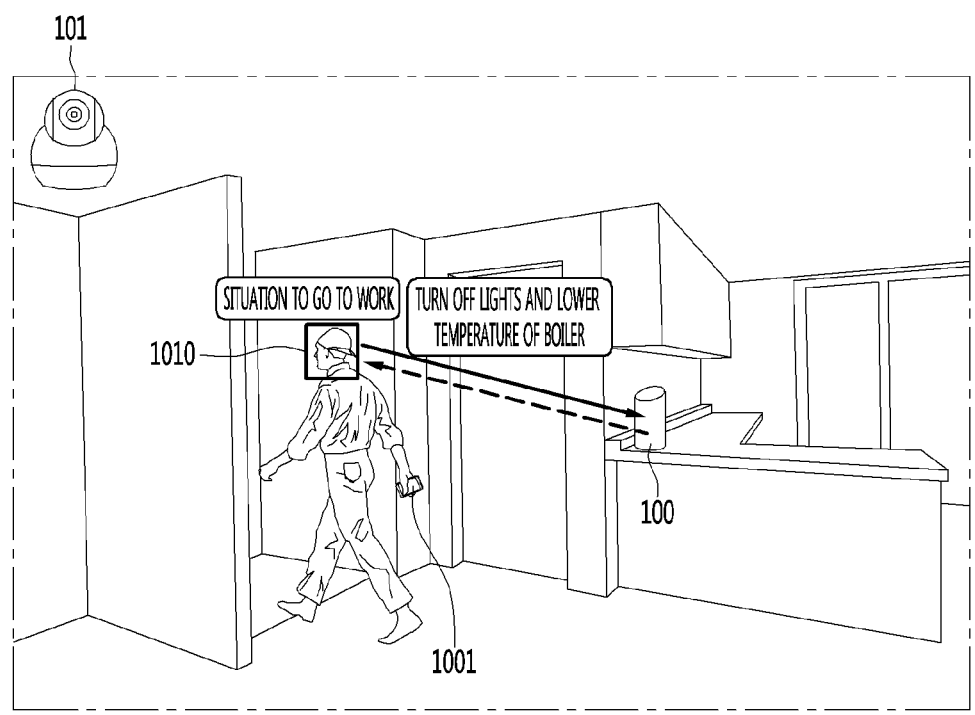
FIG. 10 is a view for explaining another example of changing a notification method of feedback information according to context information of a target.

FIG. 10 is a view for explaining another example of changing a notification method of feedback information according to context information of a target.

Referring to FIG. 10, the artificial intelligence device 100 may receive an uttered voice command from a target user 1010.

The voice command assumes <Turn off the lights and lower the boiler temperature>.

The artificial intelligence device 100 may recognize the context information of the user 1010 before providing feedback in response to the received voice command.

In a case where the user 1010 is present in the image received from the camera 101, the artificial intelligence device 100 may output feedback information in response to a voice command through the sound output unit 152.

In a case where the artificial intelligence device 100 recognizes a context in which the user 1010 is out of the home to go to work through at least one of an image received from the camera 101 and current time, a notification method for providing feedback in response to a voice command can be changed.

In a case where the user 1010 is not present in the image received from the camera 101, the artificial intelligence device 100 may recognize a context in which the user is out of the house to go to work.

As another example, in a case where the user 1010 recognizes that the user 1010 moves away from the artificial intelligence device 100 (moves another room) through the image received from the camera 101, the artificial intelligence device 100 can change the notification method providing feedback in responsive to the voice command.

In other words, in a case where the preset notification method is the sound output method, the artificial intelligence device 100 may recognize a context in which the user goes to work and change the notification method from the sound output method to the message transmission method.

The message transmission method may be a method of transmitting feedback information in a message form to the mobile terminal 1001 of the user 1010.

The artificial intelligence device 100 may automatically change the notification method according to the user's context and more effectively provide the user with feedback information corresponding to the voice command.

Figure 11:
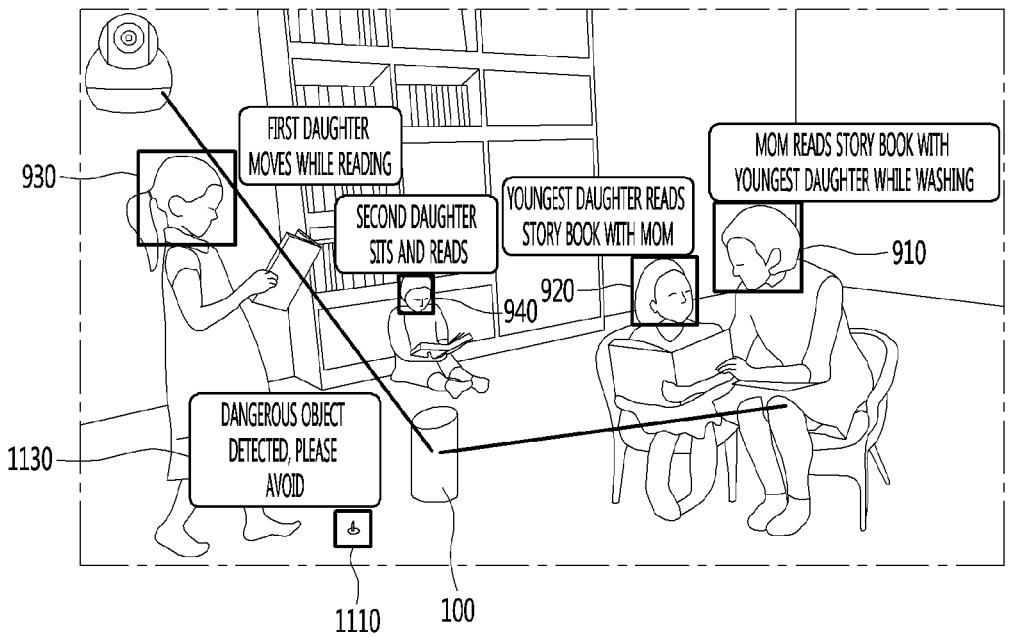
FIG. 11 is a view for explaining an example of outputting emergency feedback information indicating an emergency context regardless of context information of a target in a case where a dangerous context is detected according to an embodiment of the present invention.

FIG. 11 is a view for explaining an example of outputting emergency feedback information indicating an emergency context regardless of context information of a target in a case where a dangerous context is detected according to an embodiment of the present invention.

Description of parts overlapping with FIG. 9 in FIG. 11 will be omitted.

Referring to FIG. 11, in a case where it is determined that the dangerous object 1110 is detected on the moving path of the third user 930, the artificial intelligence device 100 may output the voice 1130 indicating the emergency context in the direction of the third user 930 regardless of the context of the first user 910.

At the same time, the artificial intelligence device 100 may output a voice 1130 indicating the emergency context with a magnitude greater than or equal to a preset intensity.

Figure 12:
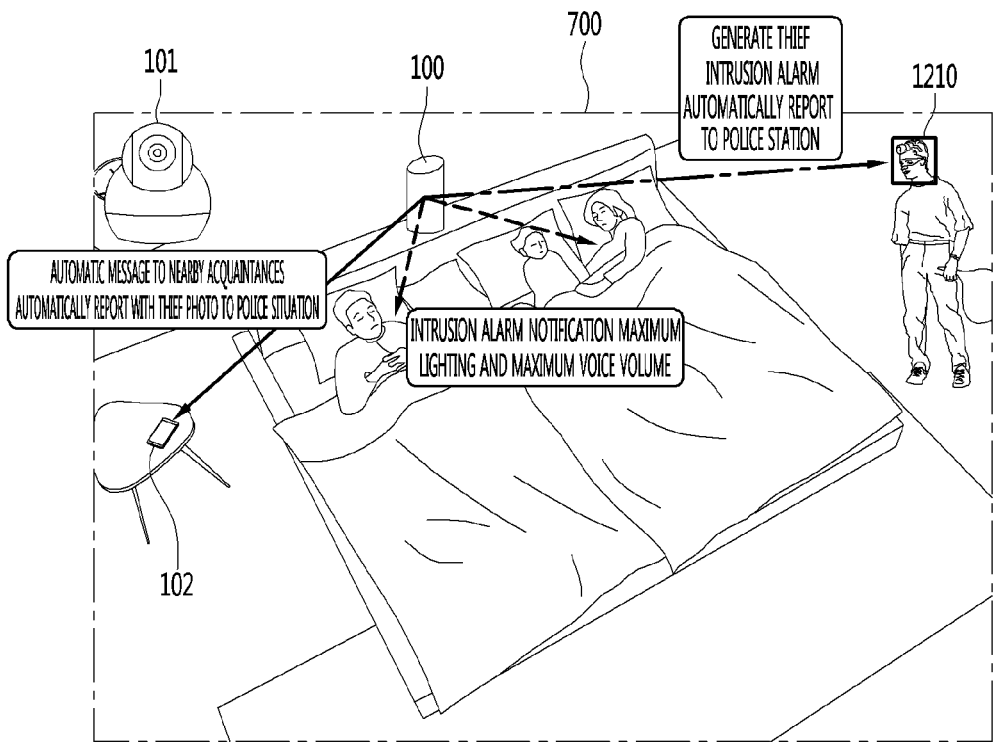
FIG. 12 is a view for explaining an example of outputting emergency feedback information indicating an emergency context, regardless of context information of a target, in a case where a dangerous context is detected according to another embodiment of the present invention.

FIG. 12 is a view for explaining an example of outputting emergency feedback information indicating an emergency context, regardless of context information of a target, in a case where a dangerous context is detected according to another embodiment of the present invention.

In FIG. 12, description of portions overlapping with FIGS. 7a to 7c will be omitted.

Referring to FIG. 12, in a case where the thief image 1210 which is predicted as a thief in the image 700 acquired through the camera 101 is detected, the artificial intelligence device 100 may output feedback notifying an emergency context regardless of the target context information.

For example, the artificial intelligence device 100 may output the voice notifying the intrusion alert at the maximum size, and at the same time, output the intensity of the light output from the light output unit 154 at the maximum intensity.

At the same time, the artificial intelligence device 100 may control the mobile terminal 102 to automatically transmit a text message to notify invasion to your acquaintance.

As another example, the artificial intelligence device 100 may automatically transmit information (location of a house, photographed image) indicating that a thief has invaded the police station.

Figure 13:
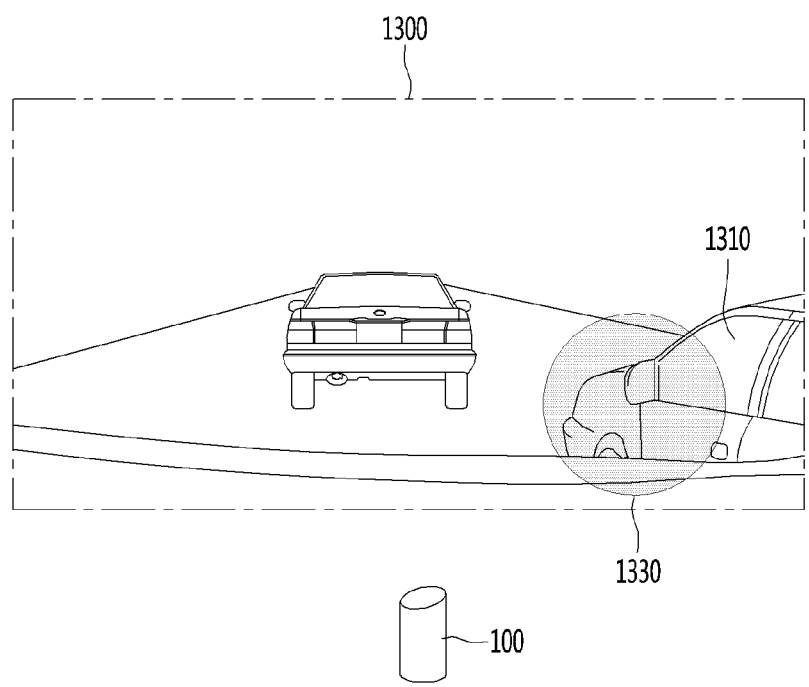
FIG. 13 is a diagram illustrating an example of recognizing context information of a vehicle and outputting a horn sound according to the recognized context information of the vehicle, according to an embodiment of the present invention.

FIG. 13 is a diagram illustrating an example of recognizing context information of a vehicle and outputting a horn sound according to the recognized context information of the vehicle, according to an embodiment of the present invention.

In FIG. 13, it is assumed that an artificial intelligence device 100 is mounted inside a vehicle.

Referring to FIG. 13, the artificial intelligence device 100 may detect a vehicle 1310 intervening in a front image acquired through a camera (not illustrated).

The artificial intelligence device 100 may determine a direction in which the vehicle 1310 intervenes, and a degree of intervention of the lane.

The artificial intelligence device 100 may output the directional horn sound according to the direction in which the vehicle 1310 intervenes and the intervention information.

At the same time, the artificial intelligence device 100 may display an indicator 1330 indicating a result of outputting the horn sound through a head-up display 1300.

At this time, the color, shape, size, or the like of the indicator 1330 may be changed according to the intensity of the horn sound output.

Accordingly, the noise generated by unnecessarily outputting the horn sound can be prevented, and the efficiency of warning the interrupting vehicle can be increased.

The present invention described above can be embodied as the computer readable codes on a medium in which a program is recorded. The computer-readable medium includes all kinds of recording devices in which data that can be read by a computer system is stored. Examples of computer-readable media include hard disk drives (HDDs), solid state disks (SSDs), silicon disk drives (SDDs), ROMs, RAMs, CD-ROMs, magnetic tapes, floppy disks, optical data storage devices, and the like. In addition, the computer may also include a controller 180 of the terminal.

Accordingly, the above detailed description should not be construed as limiting in all aspects but should be considered as illustrative. The scope of the present invention should be determined by reasonable interpretation of the appended claims, and all changes within the equivalent scope of the present invention are included in the scope of the present invention.

The invention claimed is:

1. An artificial intelligence device comprising:
a microphone configured to receive voice;
a sound output unit configured to output sound; and
one or more controllers configured to:
acquire context information of a target, based on an image received from a camera disposed outside and a voice received from the microphone,
select a target based on being an utterer by using the voice received through the microphone among the plurality of targets when a plurality of targets are included in the image,
generate feedback information indicating a prediction result using the acquired context information, and
control the sound output unit to output the feedback information in a direction of the target.

2. The artificial intelligence device of claim 1,
wherein the context information of the target includes at least one of the attributes of the target, an action of the target, and a position of the target.

3. The artificial intelligence device of claim 2,
wherein the one or more controllers determine output volume intensity of the feedback information and output the feedback information at the output volume intensity.

4. The artificial intelligence device of claim 3,
wherein the one or more controllers determine the output volume intensity of the feedback information to be less than the preset volume intensity, in a case where the intensity of the voice input through the microphone is less than a preset intensity.

5. The artificial intelligence device of claim 3,
wherein the one or more controllers determine the output volume intensity of the feedback information to be more than the preset volume intensity, in a case where the intensity of the voice input through the microphone is more than a preset intensity.

6. The artificial intelligence device of claim 1, further comprising:
a short range communication module configured to perform short range communication with mobile terminal of the target,
wherein the one or more controllers determine an output method of the feedback information according to the context information of the target, and
wherein the output method is a method of outputting the feedback information through any one of the short range communication module or the sound output unit.

7. The artificial intelligence device of claim 1, further comprising:
a short range communication module configured to perform short range communication with a mobile terminal of the target,
wherein the feedback information includes a notification received by the mobile terminal.

8. An artificial intelligence device comprising:
a short range communication module configured to perform short range communication with a mobile terminal of a target,
a microphone configured to receive voice;
a sound output unit configured to output sound; and
one or more controllers configured to:
acquire context information of a target, based on at least one of an image received from a camera disposed outside and a voice received from the microphone,
generate feedback information indicating a prediction result using the context information,
determine any one of the short range communication module or the sound output unit with an output method of the generated feedback information, and
control any one of the short range communication module or the sound output unit to output the feedback information in the determined output method,
wherein the one or more controllers are further configured to:
generate emergency context information regardless of the context information of the target, when a dangerous context of the target is detected, based on the image,
transmit the generated emergency context information to the mobile terminal through the short ran e communication module, and
output the emergency context information as a sound having a preset volume intensity or more through the sound output unit.

9. The artificial intelligence device of claim 8,
wherein the one or more controllers output the feedback information in response to the voice received through the microphone through the sound output unit in a case where the target exists in the image.

10. The artificial intelligence device of claim 8, wherein the one or more controllers transmit the feedback information in response to the voice received through the microphone to the mobile terminal through the short range communication module, in a case where the target does not exist in the image.

11. The artificial intelligence device of claim 8, wherein the context information of the target includes at least one of the attributes of the target, an action of the target, and a position of the target.

12. The artificial intelligence device of claim 11, wherein the one or more controllers select a target based on being an utterer by using the voice received through the microphone among the plurality of targets in a case where a plurality of targets are included in the image and outputs the feedback information through the sound output unit in a direction of a selected target.

* * * * *